«12» United States Patent
Yamazaki et al.

(10) Patent No.: US 9,494,906 B2
(45) Date of Patent: Nov. 15, 2016

(54) DRIVING FORCE TRANSMISSION DEVICE AND IMAGE FORMING APPARATUS USING THE SAME

(71) Applicants: Kimiharu Yamazaki, Kanagawa (JP); Keisuke Shimizu, Tokyo (JP); Hiroaki Takagi, Kanagawa (JP); Naoyuki Suido, Kanagawa (JP)

(72) Inventors: Kimiharu Yamazaki, Kanagawa (JP); Keisuke Shimizu, Tokyo (JP); Hiroaki Takagi, Kanagawa (JP); Naoyuki Suido, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/007,758

(22) Filed: Jan. 27, 2016

(65) Prior Publication Data
US 2016/0223977 A1 Aug. 4, 2016

(30) Foreign Application Priority Data

Jan. 29, 2015 (JP) ................................. 2015-015062

(51) Int. Cl.
G03G 15/00 (2006.01)
F16D 1/10 (2006.01)

(52) U.S. Cl.
CPC ............. *G03G 15/757* (2013.01); *F16D 1/101* (2013.01); *F16D 2001/103* (2013.01)

(58) Field of Classification Search
CPC ........................... G03G 15/757; G03G 21/186
USPC ........................................................ 399/167
See application file for complete search history.

(56) References Cited

U.S. PATENT DOCUMENTS

| 6,385,418 | B1 * | 5/2002 | Fukuchi | ............... | G03G 15/757 |
| | | | | | 399/167 |
| 8,135,304 | B2 * | 3/2012 | Abe et al. | ............ | G03G 21/186 |
| | | | | | 399/167 |
| 8,478,166 | B2 * | 7/2013 | Hara et al. | ........... | G03G 21/186 |
| | | | | | 399/167 |
| 2009/0185846 | A1 | 7/2009 | Okamoto | | |
| 2013/0065725 | A1 | 3/2013 | Matsuda et al. | | |

FOREIGN PATENT DOCUMENTS

| JP | 2007-108349 | 4/2007 |
| JP | 2007-240007 | 9/2007 |
| JP | 2007-304628 | 11/2007 |
| JP | 2009-173365 | 8/2009 |
| JP | 2009-179441 | 8/2009 |
| JP | 2012-27120 | 2/2012 |
| JP | 2014-63082 | 4/2014 |
| JP | 2014-142431 | 8/2014 |
| JP | 2015-84020 | 4/2015 |

OTHER PUBLICATIONS

U.S. Appl. No. 14/712,000, filed May 14, 2015.

* cited by examiner

*Primary Examiner* — William J Royer
(74) *Attorney, Agent, or Firm* — Harness, Dickey & Pierce, P.L.C.

(57) ABSTRACT

A driving force transmission device that transmits a driving force to a rotation body includes a flange member provided in the rotation body, a through shaft that is connected to the flange member to transmit the driving force to the rotation body via the flange member, and an intermediate transmission member that is provided in the through shaft to transmit the driving force to the flange member from the through shaft.

8 Claims, 4 Drawing Sheets

DRIVING FORCE TRANSMISSION DEVICE AND IMAGE FORMING APPARATUS USING THE SAME

CROSS-REFERENCE TO RELATED APPLICATION

The present application is based on and claims priority to Japanese patent application No. 2015-015062, filed Jan. 29, 2015, the disclosure of which is hereby incorporated by reference herein in its entirety.

BACKGROUND

1. Technical Field

The present invention relates to a driving force transmission device and an image forming apparatus using the same.

2. Description of Related Art

An image forming apparatus including a unitized consumable component such as a photoconductor drum has been known. Such a unitized consumable component is removably attached to the main body (hereinafter referred to as an apparatus body) of the image forming apparatus to be exchanged by a user. For example, each of a photoconductor drum, charging device, developing device, and cleaner is unitized to be removed from the apparatus body, and a driving force is transmitted to these units from the apparatus body. A tandem image forming apparatus includes four image forming units corresponding to the four colors of yellow, magenta, cyan, and black. These image forming units are attached to the apparatus body, so that photoconductor drums, development rollers, and the like rotate to form an image. The apparatus body also includes a motor and a speed reduction unit which are driving sources for rotating the photoconductor drum, the development roller, and the like. The speed reduction unit is connected to the photoconductor drum to transmit driving force.

Various connection members between the speed reduction unit and the photoconductor drum have been proposed. For example, a spline coupling using an external gear and an internal gear has been proposed. Since the image forming unit is removably attached to the apparatus body, when the photoconductor drum and the speed reduction unit are connected by this spline coupling, eccentricity and a deflection angle occur between the output shaft of the speed reduction unit provided in the apparatus body and the shaft of the photoconductor drum attached to the speed reduction unit. Such eccentricity and a deflection angle also occur between the shafts of the external gear and the internal gear.

An image forming apparatus described in Patent Literature 1 (Japanese Patent No. 4775947) includes a serration coupling using a guide member. However, since such a serration coupling does not have a configuration which absorbs shift and eccentricity between a driving shaft and a driven shaft, an axis reaction force may occur due to a variation in component accuracy, resulting in deterioration in rotation of a driving target.

An image forming apparatus described in Patent Literature 2 (Japanese Laid-Open Patent Application No. 2007-240007) has a configuration which absorbs such shift and misalignment between a driving shaft and a driven shaft. A parallel pin is pressed into the driving shaft and the driven shaft, and an intermediate body engaging with the parallel pin is held to reduce the axis reaction force due to a variation in component accuracy. However, such a configuration doubles the rotation irregularity since the driving force is transmitted by the two positions of the top and bottom portions of the parallel pin.

Patent Literature 3 (Japanese Laid-Open Patent Application No. 2014-142431) describes a configuration in which crowned teeth of an internal gear and an external gear of an intermediate body engage with an internal gear of a flange and a sintered gear pressed into a drum shaft, respectively, so as to reduce the axis reaction force in the engagement portions. However, in order to hold the intermediate body, an image forming apparatus described in Patent Literature 3 requires an internal gear flange having a member for determining a coaxial level and a member for retaining the intermediate body to be pressed into a drum. Consequently, such an image forming apparatus has a problem in an assembly performance, and may deteriorate highly accurate straightness and deflection that are required for a drum such as a photoconductor drum.

Patent Literatures 3 describe a technique using a two-stage spline joint including a flexible intermediate body having a crowned external gear to improve rotation irregularity by dispersing load with the increased number of driving force transmission portions (teeth number). However, when this configuration is applied to the flange of the drum such as a photoconductor drum, it is difficult to provide the crowned external gear to the drum in view of a layout.

SUMMARY

An object of the present invention is, therefore, to provide a driving force transmission device and an image forming apparatus using a connection structure between a through shaft which penetrates through a device such as an image forming unit and a rotation body of the image forming unit. The connection structure achieves a reduced space and a reduced axis reaction force in view of an assembly performance of a rotation body.

To achieve the above object, an aspect of the present invention provides a driving force transmission device that transmits a driving force to a rotation body. The device includes a flange member provided in the rotation body, a through shaft that is connected to the flange member to transmit the driving force to the rotation body via the flange member, and an intermediate transmission member that is provided in the through shaft to transmit the driving force to the flange member from the through shaft. The flange member includes a coaxial level control hole that controls a coaxial level with the through shaft, a cylindrical portion that extends in an axis direction to control a squareness to the through shaft, a thrust portion that controls movement in the axis direction, and an internal gear having teeth extending in the axis direction. The through shaft includes a parallel pin pressed in a vertical direction of the shaft and a thrust member that controls a thrust direction of the rotation body by contact with the thrust portion. The intermediate transmission member includes an external gear that engages with the internal gear, a driving force receiving groove that receives the driving force from the parallel pin pressed into the through shaft, and an inner diameter portion having a space relative to an outer circumference portion of the through shaft while being supported to move the through shaft in the axis direction.

DETAILED DESCRIPTION

Hereinafter, an embodiment of the present invention will be described with reference to the drawings. The embodiment of the present invention uses a spline joint including a through shaft, which is applied to a connection portion in an image forming apparatus, and has the following features. The embodiment describes an intermediate transmission member that is flexibly movable to an axis reaction force occurred in an engagement portion when transmitting driving force to a flange of a photoconductor drum, so as to reduce the axis reaction force as much as possible. The embodiment also describes a configuration which prevents the surface of the photoconductor drum from being affected by the axis reaction force in the drum flange.

Figure 1:
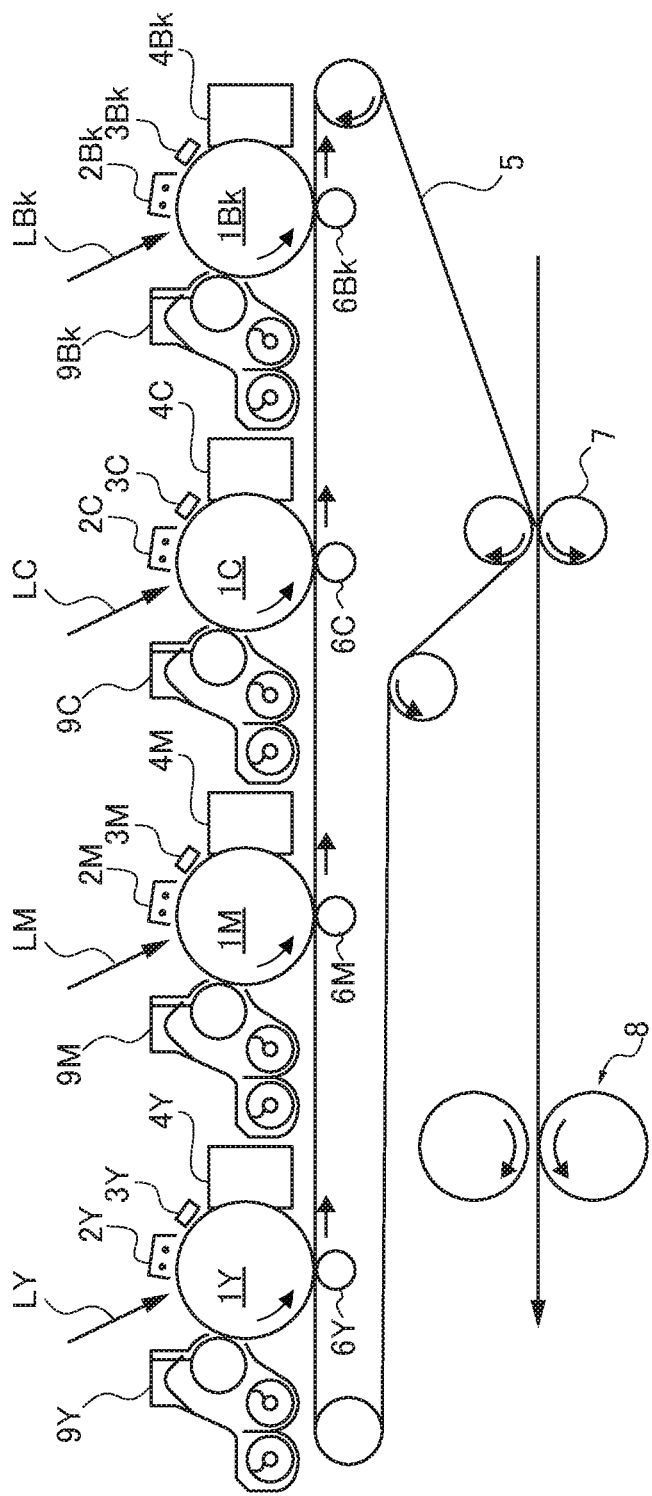
FIG. 1 is a view showing a general configuration of a copier as an image forming apparatus to which a driving force transmission device according to an embodiment of the present invention is applied.

FIG. 1 is view showing a general configuration of a copier as an image forming apparatus to which a driving force transmission device is applied. The apparatus shown in FIG. 1 is a tandem electrophotographic color copier, and performs a process of visualizing an electrostatic latent image with a two-component developing method using dry two-component developer. In this embodiment the driving force transmission device is applied to the copier, but the driving force transmission device may be applied to a printer, facsimile, printing machine, a multifunction machine, and the like.

The copier shown in FIG. 1 performs an image forming process by receiving image data of image information from a not-shown image reader. The copier includes four photoconductor drums 1Y, 1M, 1C, and 1Bk which are arranged in parallel and are latent image carriers as rotation bodies for four colors of yellow (Y), magenta (M), cyan (C), and black (Bk). These photoconductor drums 1Y, 1M, 1C, and 1Bk are arranged along a belt moving direction to have contact with an endless intermediate transfer belt 5 supported by a plurality of rollers including a driving roller.

Each of the photoconductor drums 1Y, 1M, 1C, and 1Bk includes therearound a charging device 2Y, 2M, 2C, and 2Bk, a developing device 9Y, 9M, 9C, and 9Bk, a cleaner 4Y, 4M, 4C, and 4Bk, and a neutralizer 3Y, 3M, 3C, and 3Bk. These devices for an electrophotographic process are provided in accordance with an order of a process. Each of the photoconductor drums 1Y, 1M, 1C, and 1Bk is detachably attached to an apparatus body in the axis line direction.

Hereinafter, a process of forming a full color image with the copier shown in FIG. 1 will be described. The photoconductor drum 1Y is uniformly charged by the charging device 2Y while rotating in the arrow direction in FIG. 1 with the after-described photoconductor drum driver. After that, the photoconductor drum 1Y is irradiated with a light beam LY from a not-shown optical writer to form a Y electrostatic latent image. The Y electrostatic latent image is developed by Y toner of a developer by the developing device 9Y. In developing, a predetermined development bias voltage is applied between a development roller and the photoconductor drum 1Y, and the Y toner on the development roller is electrostatically absorbed to the Y electrostatic latent image on the photoconductor drum 1Y.

A Y toner image formed as described above is fed to a first transfer position where the photoconductor drum 1Y has contact with the intermediate transfer belt 5 along the rotation of the photoconductor drum 1Y. A predetermined bias voltage is applied to the rear surface of the intermediate transfer belt 5 in the first transfer position by a primary transfer roller 6Y. The Y toner image on the photoconductor drum 1Y is transferred onto the intermediate transfer belt 5 by a primary transfer electric field generated by the application of the bias voltage. An M toner image, C toner image, and Bk toner image are sequentially transferred onto the Y toner image on the intermediate transfer belt 5 to be superimposed in the same manner.

The superimposed toner images on the intermediate transfer belt 5 are fed to a second transfer position facing a secondary transfer roller 7 along the rotation of the intermediate transfer belt 5. A transfer sheet is fed to the second transfer position by a not-shown registration roller in predetermined timing. A predetermined bias voltage is applied to the rear surface of the transfer sheet by the secondary transfer roller 7 in the second transfer position, and the toner images on the intermediate transfer belt 5 are all secondary transferred onto the transfer sheet by the secondary transfer electric field generated by the application of the bias voltage and the contact pressure in the second transfer position. After that, the transfer sheet onto which the toner images are secondary transferred is discharged outside after a fixing process with a pair of fixing rollers 8.

Figure 2:
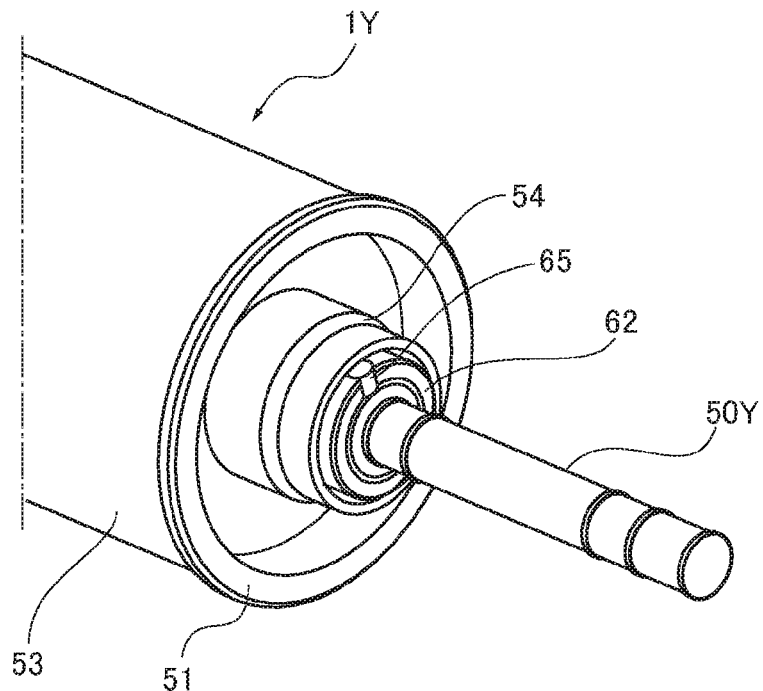
FIG. 2 is a view showing an image forming unit using a connection structure according to the embodiment of the present invention.
Figure 3:
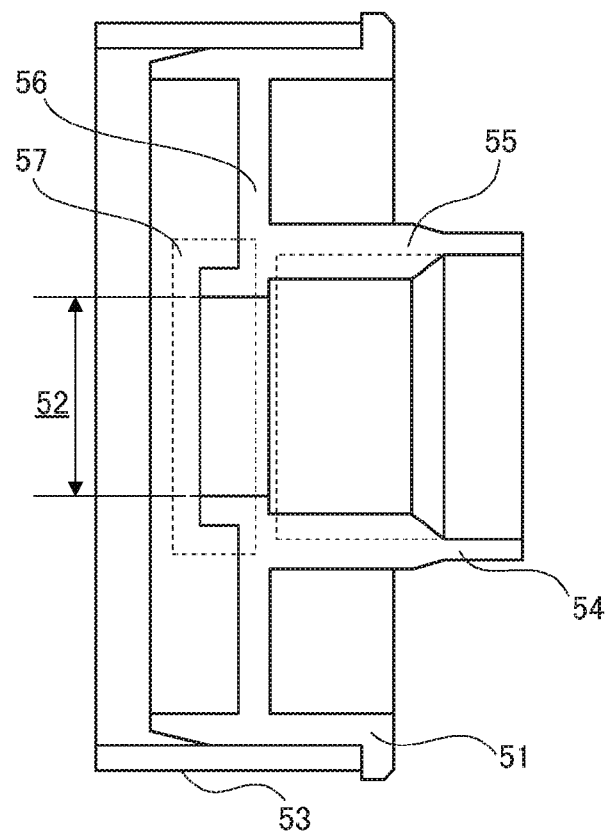
FIG. 3 is a view showing a configuration of a photoconductor drum in a drum joint according to the embodiment of the present invention.

FIG. 2 is a view showing the image forming unit using a connection structure according to the embodiment of the present invention. FIG. 3 is a view showing a configuration of the photoconductor drum in a drum joint according to the embodiment of the present invention. The photoconductor drum in the image forming apparatus such as a printer and a photoconductor driving shaft provided in the apparatus body are described with reference to FIGS. 2 and 3. In this embodiment, the photoconductor drum is described as a driven body. However, the embodiment of the present invention can be applied to a transfer roller, development roller, and cleaning roller which have a through shaft, for example.

Since the photoconductor drums 1Y, 1M, 1C, and 1Bk are rotated by photoconductor drivers each having the same configuration, respectively, the connection between the photoconductor drum 1Y and the photoconductor driver will be hereinafter described. As illustrated in FIG. 1, the photoconductor drum 1Y is attached to the apparatus body, and the photoconductor drum 1Y is supported by a drum shaft 50Y (through shaft), as illustrated in FIG. 2. The drum shaft 50Y is a metal shaft, for example.

A drum flange 51 is pressed into the photoconductor drum 1Y, as shown in FIG. 3. The drum flange 51 is a flange member into which the drum shaft 50Y is fitted with high accuracy. The drum flange 51 has a through hole 52 that controls straightness and deflection of the drum shaft 50Y of the photoconductor drum 1Y when the drum shaft 50Y is fitted into the through hole 52. Namely, the through hole 52 is a coaxial level control hole that controls the coaxial level between the through hole 52 and the drum shaft 50Y. In order to improve the deflection and the straightness of the photoconductor drum 1Y after the drum flange 51 is pressed into a tube 53 of the photoconductor drum 1Y, the drum flange 51 is required to be secondary processed. The drum flange 51 therefore includes a protrusion 54 that is chucked by a machining tool.

An internal gear 55 including teeth extending in the axis direction of the drum shaft 50Y is provided inside the protrusion 54. The drum flange 51 is driven by the internal gear 55, so that the photoconductor drum 1Y rotates. A web face 56 of the drum flange 51 is formed in the end portion of the internal gear 55. Even when the axis reaction force occurs in the internal gear 55, such a force is barely conveyed to the web face 56. Consequently, the surface of the photoconductor drum 1Y is prevented from being vibrated. The through hole 52 includes a cylindrical portion 57 having a sufficient length on the opposite side of the internal gear 55. The cylindrical portion 57 extends in the axis direction of the drum shaft 50Y to control the squareness of the drum shaft 50Y. Even when the axis reaction force occurs in the internal gear 55, the web face 56 hardly falls. The surface of the photoconductor drum 1Y is therefore prevented from being vibrated in rotation.

Figure 4:
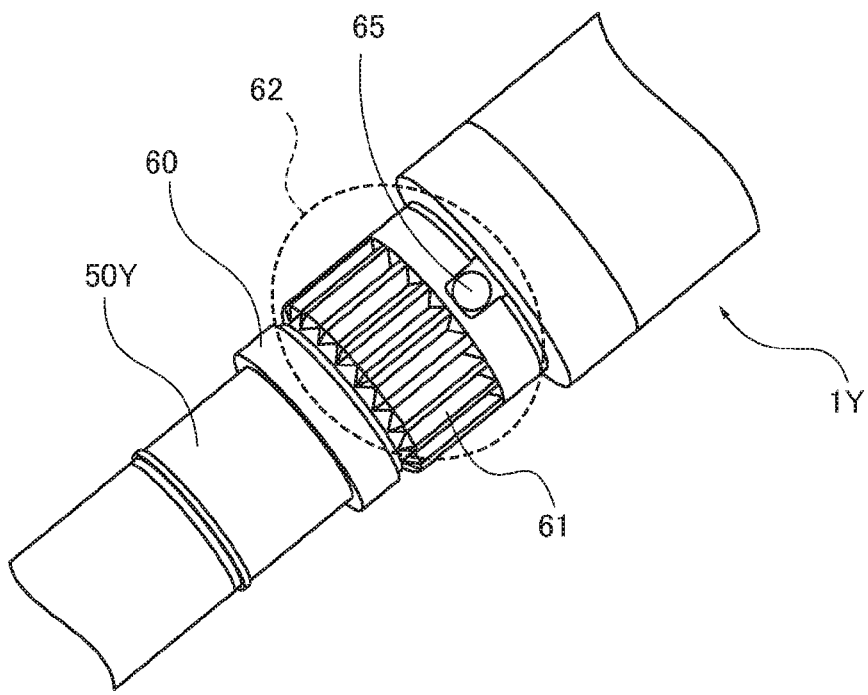
FIG. 4 is a view showing a configuration of a drum shaft in the drum joint according to the embodiment of the present invention.
Figure 5:
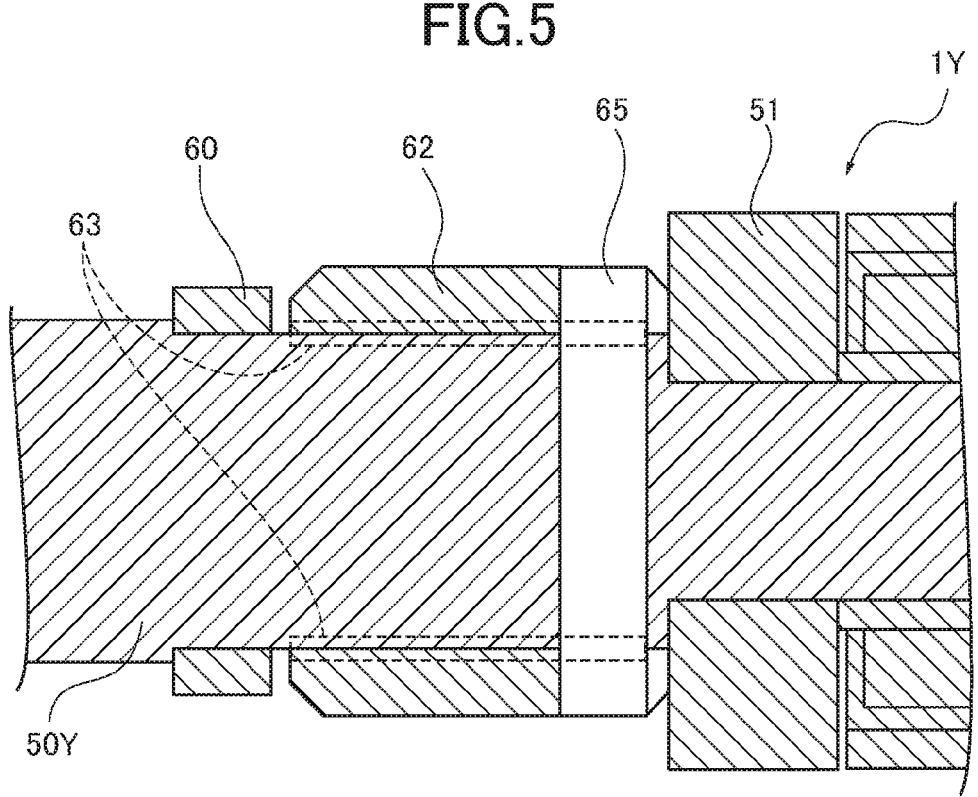
FIG. 5 is a view showing a configuration of a clearance between the drum shaft and an intermediate transmission member according to the embodiment of the present invention.
Figure 6:
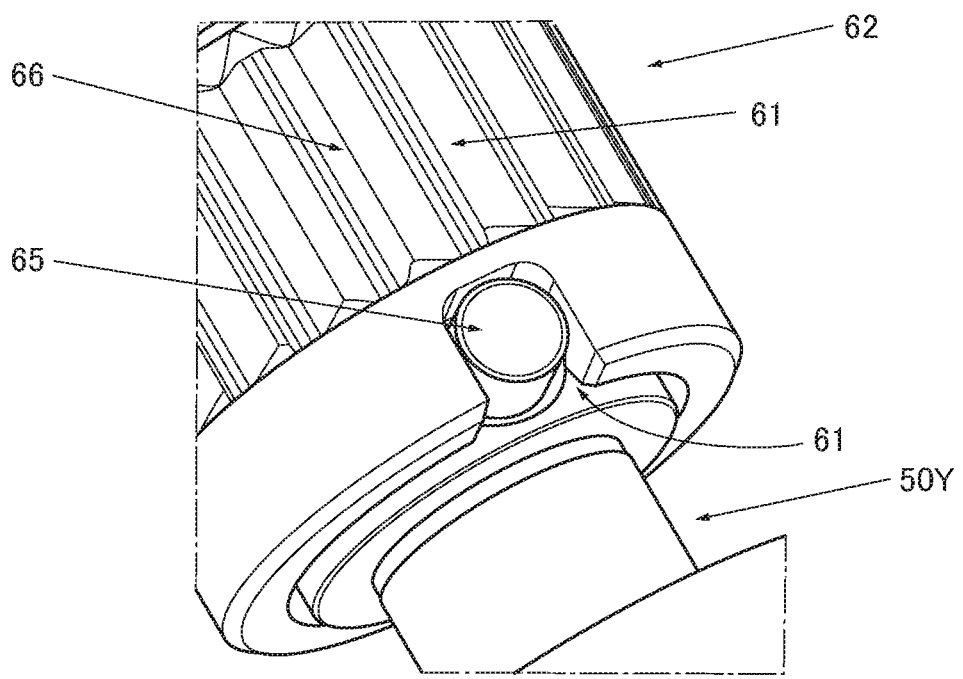
FIG. 6 is a view showing a U type groove of the intermediate transmission member according to the embodiment of the present invention.

FIG. 4 is a view showing the configuration of the drum shaft 50Y in a drum joint according to the embodiment of the present invention. FIG. 5 is a view showing a space (clearance) between an intermediate transmission member 62 and the drum shaft 50Y. FIG. 6 is a view showing a U type groove 66 of the intermediate transmission member 62 according to the embodiment of the present invention.

A thrust member 60 that determines a thrust position of the drum flange 51 is pressed into the drum shaft 50Y. The thrust member 60 has contact with the end portion of the through hole 52 of the drum flange 51, namely, a thrust portion to determine the position of the photoconductor drum 1Y in the thrust direction.

The intermediate transmission member 62 having an external gear 61 is held in the drum shaft 50Y. As illustrated in FIG. 5, a sufficient clearance 63 is provided between an inner diameter portion of the intermediate transmission member 62 and an outer circumference portion of the drum shaft 50Y. The intermediate transmission member 62 therefore freely moves (refer to FIG. 6). By separately manufacturing the thrust member 60 and the drum shaft 50Y as the through shaft, the material and processing costs of the drum shaft 50Y can be lowered. It is preferable for the thrust member 60 to be a sintered member. A strength required for supporting load in the thrust direction can be obtained by the sintered member.

It is preferable for the teeth of the external gear 61 and the internal gear 55 to have sufficient backlash at a pressure angle of 30°. With the pressure angle of 30°, the strength in the tooth root is improved to increase durability. The sufficient backlash is thereby obtained between the gears. The intermediate transmission member 62 therefore freely tilts in the engagement position of the external gear 61 and the internal gear 55, and thus, the misalignment absorption performance is improved to easily reduce the axis reaction force. It is preferable for the end portions of the teeth on the engaging gear side between the external gear 61 and the internal gear 55 to have a tapered shape for smoothly and repeatedly attaching and removing the image forming unit including the photoconductor drum 1Y. The tapered shape is often used as a joint. One of the teeth can be set as a tooth to be firstly engaged for improving an engagement performance. For example, it is preferable for one of the teeth of the internal gear 55 to have a width larger than those of the other teeth.

In the above embodiment, the drum flange 51 is driven via the external gear 61 of the intermediate transmission member 62. However, the eccentricity occurs between the internal gear 55 of the drum flange 51 and the external gear 61 of the intermediate transmission member 62 for a processing reason. Consequently, the center of the internal gear 55 and the center of the external gear 61 are always misaligned. It is necessary to absorb such eccentricity by the tilt of the intermediate transmission member 62 to transmit a highly accurate driving force. As described above, the sufficient clearance 63 is provided between the inner diameter portion of the intermediate transmission member 62 and the outer circumference portion of the drum shaft 50Y. It is necessary for the clearance 63 to ensure a size that sufficiently absorbs the above eccentricity (refer to FIG. 5). The intermediate transmission member 62 includes in the outer circumference thereof a U type groove 66 extending along the axis direction. The intermediate transmission member 62 is made of a resin material or a sintered material. When the intermediate transmission member 62 is made of the sintered member and such a member requires a secondary process, the costs for manufacturing the member are increased. However, when the U type groove 66 has a constant length or below, the secondary process is not required. Thus, an increase in cost can be controlled.

A parallel pin 65 is fitted into the U type groove 66. The U type groove 66 receives the driving force from the parallel pin 65 as a driving force receiving groove. The parallel pin 65 is pressed into the drum shaft 50Y in the vertical direction of the axis, and is a positioning pin provided to protrude outside in the diameter direction. Grease may be applied to the parallel pin 65 for further reducing the axis reaction force by reducing the contact friction between the U type groove 66 and the parallel pin 65. However, a defect image is generated when the grease is dispersed onto the image forming region of the photoconductor drum 1Y. To prevent this dispersion, the protrusion 54 illustrated in FIG. 3 has a length that covers the parallel pin 65. Namely, the protrusion 54 is a cylindrical portion provided in the teeth end portion of the internal gear 55 of the drum flange 51, having a diameter larger than that of the teeth bottom of the internal gear 55, and having a shape that covers the upper portion of the parallel pin 65. The protrusion 54 covers the parallel pin 65 even when the grease is applied to the parallel pin 65. The grease is thus prevented from being dispersed onto the image forming region of the photoconductor drum 1Y. As illustrated in FIG. 5, a pair of parallel pins 65 is provided in symmetry positions of the external gear 61 in the diameter direction. However, the parallel pins 65 may be provided in another position, or a single parallel pin 65 may be provided.

As described above, the embodiment of the present invention uses a so-called two-stage spline coupling. Namely, the drum flange 51 includes the through hole 52 for positioning the drum shaft 50Y as the through shaft. The through hole 52 includes the cylindrical portion 57 having a sufficient length. The drum flange 51 also includes the thrust member 60 as a thrust stop mechanism, and the internal gear 55 for transmitting the driving force to the photoconductor drum 1Y. The web face 56 constituting the web position is provided in the end portion of the internal gear 55.

The drum shaft 50Y includes the thrust member 60 as a thrust stop mechanism of the drum flange 51 in the axis direction and the intermediate transmission member 62 having the external gear 61 engaging with the internal gear 55 of the drum flange 51. The drum shaft 50Y also includes the parallel pin 65 pressed into the shaft to transmit the driving force to the intermediate transmission member 62. The intermediate transmission member 62 includes the clearance 63 between the outer diameter portion of the drum shaft 50Y and the inner diameter portion of the intermediate transmission member 62 to sufficiently absorb the misalignment.

Therefore, the drum assembly component is positioned in the through hole 52 relative to the drum shaft 50Y, and is supported by the cylindrical portion 57 having a sufficient length. The drum flange 51 is thereby prevented from being tilted, and the thrust direction is determined, so that the image-forming region is stabilized.

The driving force of the drum shaft 50Y is supplied to the drum flange 51 from the internal gear 55. Since a sufficient distance is provided between the web face 56 and one end portion of the internal gear 55, the deformation of the drum flange 51 is barely affected to the web face 56. Thus, the straightness of the drum (photoconductor drum 1Y) is maintained, and the surface of the drum (photoconductor drum 1Y) is prevented from being vibrated barely even when a load is applied to the end portion of the internal gear 55 from the drum shaft 50Y.

The position of the drum flange 51 is controlled by the thrust member 60 of the drum shaft 50Y. The driving force is transmitted via the external gear 61 of the drum shaft 50Y. The driving force is transmitted to the intermediate transmission member 62 for driving from the drum shaft 50Y via the parallel pin 65. The misalignment such as shaft shift and eccentricity between the drum flange 51 and the drum shaft 50Y due to a machining accuracy of a component is absorbed by the tilt of the intermediate transmission member 62 in the clearance 63. The intermediate transmission member 62 includes the clearance 63 to reduce the axis reaction force from the coupling portion. As described above, a high performance drum joint can be provided to the image forming apparatus.

According to the embodiment of the present invention, a highly accurate driving force can be applied to the rotation body by the through shaft without deteriorating the speed fluctuation and the surface vibration of the rotation body due to the axis reaction force in the connection portion between the rotation body and the through shaft.

Although the present invention has been described in terms of an exemplary embodiment, it is not limited thereto. It should be appreciated that variations or modifications may be made in the embodiment described by persons skilled in the art without departing from the scope of the present invention as defined by the following claims.

What is claimed is:

1. A driving force transmission device that transmits a driving force to a rotation body, the device comprising:
   a flange member provided in the rotation body;
   a through shaft that is connected to the flange member to transmit the driving force to the rotation body via the flange member; and
   an intermediate transmission member that is provided in the through shaft to transmit the driving force to the flange member from the through shaft, wherein
   the flange member includes a coaxial level control hole that controls a coaxial level with the through shaft, a cylindrical portion that extends in an axis direction to control a squareness to the through shaft, a thrust portion that controls movement in the axis direction, and an internal gear having teeth extending in the axis direction,
   the through shaft includes a parallel pin pressed in a vertical direction of the shaft and a thrust member that controls a thrust direction of the rotation body by contact with the thrust portion, and
   the intermediate transmission member includes an external gear that engages with the internal gear, a driving force receiving groove that receives the driving force from the parallel pin pressed into the through shaft, and an inner diameter portion having a space relative to an outer circumference portion of the through shaft while being supported to move the through shaft in the axis direction.

2. The driving force transmission device according to claim 1, wherein
   teeth of the external gear and the teeth of the internal gear have backlash at a pressure angle of 30°.

3. The driving force transmission device according to claim 1, wherein
   the driving force receiving groove is a U type groove.

4. The driving force transmission device according to claim 1, wherein
   the thrust member is a sintered member, and is pressed into the through shaft.

5. The driving force transmission device according to claim 1, wherein
   the flange member has a cylindrical portion provided in a teeth end portion of the internal gear, and the cylindrical portion has a diameter larger than that of a teeth bottom and a shape that covers an upper portion of the parallel pin.

6. The driving force transmission device according to claim 1, wherein
   a teeth end portion on an engaging side between the internal gear of the flange member and the external gear of the intermediate transmission member has a tapered shape, and one of the teeth of the internal gear has a teeth width larger than those of the other teeth.

7. The driving force transmission device according to claim 1, wherein
   the rotation body is a photoconductor drum.

8. An image forming apparatus comprising the driving force transmission device according to claim 1.

* * * * *